United States Patent [19]

VanGundy et al.

[11] Patent Number: 5,396,730

[45] Date of Patent: Mar. 14, 1995

[54] POINT SOURCE INSECTICIDE DISPENSER

[75] Inventors: Douglas N. VanGundy, Dallas; Lloyd T. Tate, Temple; Eric P. Duffey, Framers Branch; Robert C. Pearce, III, Arlington, all of Tex.

[73] Assignee: Sandoz Ltd., Basel, Switzerland

[21] Appl. No.: 265,582

[22] Filed: Jun. 23, 1994

Related U.S. Application Data

[63] Continuation of Ser. No. 12,706, Feb. 3, 1993, abandoned, which is a continuation of Ser. No. 927,090, Aug. 7, 1992, abandoned, which is a continuation-in-part of Ser. No. 580,018, Sep. 10, 1990, abandoned.

[51] Int. Cl.⁶ .............................................. A01M 25/00
[52] U.S. Cl. ...................................... 43/131; 43/132.1
[58] Field of Search ....................... 43/131, 132.1, 124, 43/129

[56] References Cited

U.S. PATENT DOCUMENTS

| | | | |
|---|---|---|---|
| 3,032,915 | 5/1962 | Giroud-Abel | 43/131 |
| 3,906,656 | 9/1975 | Burke et al. | 43/131 |
| 3,931,692 | 1/1976 | Hermanson | 43/131 |
| 4,215,508 | 8/1980 | Allen et al. | 43/131 |
| 4,247,042 | 1/1981 | Schimanski et al. | 239/43 |
| 4,526,320 | 7/1985 | von Philip et al. | 239/43 |
| 4,899,485 | 2/1990 | Schneidmiller | 43/122 |

FOREIGN PATENT DOCUMENTS

| | | | |
|---|---|---|---|
| 94499 | 11/1983 | European Pat. Off. | A01M 1/20 |
| 161217 | 11/1985 | European Pat. Off. | A61L 9/12 |
| 2417940 | 9/1979 | France | A01M 1/20 |
| 2174908 | 11/1986 | United Kingdom | A01N 49/00 |

*Primary Examiner*—P. Austin Bradley
*Assistant Examiner*—Chuck Y. Mah
*Attorney, Agent, or Firm*—Allen E. Norris

[57] ABSTRACT

A point source insect control device which comprises a frangible container poorly permeable to gases and liquids containing a liquid insecticidal substance capable of translocation; a sheet of absorbent material at least one portion of which at least partially surrounds or is in close proximity with the container, and an enclosure for the container and absorbent sheet which bears multiple perforations or apertures sufficient to allow translocation of the insecticidal substances once the frangible container is ruptured.

11 Claims, 1 Drawing Sheet

POINT SOURCE INSECTICIDE DISPENSER

This is a continuation of application Ser. No. 08/012,706, filed on Feb. 3, 1993, now abandoned, which is a continuation of application Ser. No. 07/927,090, filed Aug. 7, 1992, now abandoned, which is a continuation-in-part of application Ser. No. 07/580,018, filed Sep. 10, 1990, now abandoned.

The present invention concerns a method and a device for the effective and long term control of household pests in particular cockroaches and other non-flying insects.

More particularly the invention concerns a point source release device for insecticidal compounds and its use in combatting household pests especially cockroaches and other non-flying insects.

In order to achieve adequate distribution of an insecticide to harborage areas of household pests to be controlled foggers and aerosols have been used which, however, suffer from the disadvantage of requiring the use of relatively large amounts of solvents, propellants and the like. Insecticides, especially for example insect growth regulators, may be incorporated in bait stations which are visited by the pests who then carry the insecticide back to the harborage areas. Such bait stations whilst achieving some effect have the disadvantage of relative unpredictability and often insufficient shelf-life.

Insecticides which are able to translocate through volatility or other properties would overcome many of the problems outlined above as they could be applied from strategically placed point sources from whence they would translocate to provide total coverage of the enclosed area to be treated. Until now however attempts to make such devices have failed largely because the very nature of these mobile compounds leads to low container-stability and thus low shelf-life.

It has now been found that excellent results can be achieved according to the invention by providing a point source insect control device which comprises a frangible container poorly permeable to gases and liquids containing a liquid insecticidal substance capable of translocation; a sheet of absorbent material at least one portion of which at least partially surrounds or is in close proximity with said container; and an enclosure for said container and said absorbent sheet; said enclosure bearing multiple perforations or apertures sufficient to allow translocation of said insecticidal substances once said frangible container is ruptured.

In a preferred embodiment the absorbent sheet will be of synthetic or natural fiber, i.e. cloth or paper, e.g. filter paper.

Other types of absorbent sheets which are suitable for translocating said insecticidal substance from said container to said perforations or apertures will be evident to those skilled in the art.

In a further preferred embodiment the enclosure will bear a recess fashioned to accommodate the container. The enclosure will preferably be made of flexible material to allow pressure to be applied to the container within the enclosure to rupture it. Examples of materials from which the enclosure may be made are fiberboard, cardboard, rubber or preferably plastics, especially flexible plastics such as thermoplastic resins, e.g. polypropylene, polyethylene, polyvinyl chloride and the like. Other suitable materials will be evident to those skilled in the art.

The container for the insecticide maybe made from any materials which are frangible and poorly permeable to gases and liquids. In the context of the present invention the term "frangible" as applied to materials has its art accepted meaning of being rigid such that it is brittle or fragile to breakage. Examples include rigid plastics such as thermoserring resins, e.g. polyacrylates and polystyrene or most preferably glass. Other suitable materials will be evident to those skilled in the art.

The device and its various components may be manufactured in conventional manner from the materials mentioned above.

An example of such a device comprises a flat circular disk that is mesh-like in construction. The disk also bears a pod-like recess in which lays a glass ampule containing the active ingredient (a.i.). The disk is made by injection molding. The device is molded as one piece comprising side by side equally sized disks but, upon final construction the device is overlapped to form a "sandwich." Between the overlapping disks is a piece of filter paper. One end of the filter paper extends into the pod and wraps around the ampule containing the a.i. Once complete the sandwich is fastened together around the rims of the now overlapping disk, in a manner evident to those skilled in the art, e.g. by heat or sonic welding to maintain a permanent seal. Other methods of fastening include e.g. use of suitable adhesives or mechanical means such as locking non-retractable pin devices e.g. employing male pins having heads of greater diameter than the holes through which they may be deformably urged (c.f. U.S. Pat. No. 3,731,414). The area above the pod may be thickened to provide a pressure pad which facilitates rupture of the ampule on application of pressure.

The size of the device is not critical and will usually be dictated by convenience of packaging and handling. A circular device such as described above and below would conveniently be of diameter between 5 and 8 cms. Other shapes are envisaged e.g. rectangular, the particular shape and size being selected according to the environment in which the device will ultimately be used.

For use in combatting household pests especially insects such as cockroaches the user takes the device and ruptures e.g. crushes the a.i. container, thus releasing the a.i. onto the absorbent sheet and places the device in an area which is as close as convenient to the insect's harborage area. The a.i. then translocates through the perforations or apertures in the enclosure to eventually cover the surrounding area including the harborage area itself.

Such devices can be used in any areas where control of such pests in desired e.g. single and multi-family dwellings, restaurants, zoos, nursing homes, pet shops, etc.

The number and placing of the devices will depend upon the size and layout of the area to be treated and the efficacy of the a.i. employed.

Suitable active ingredients are those which are capable of translocation and conveniently will have low polarity, moderate volatility (but not necessarily high vapor pressure) and high insecticidal activity. Examples of such compounds are the insect growth regulators described in U.S. Pat. No. 4,021,461 and U.S. Pat. No. 3,904,662 hereby incorporated by reference. These include e.g. methoprene, kinoprene and especially hydroprene. Hydroprene is the common name for ethyl (2E,-4E)-3,7,11-trimethyl-2,4-dodecadienoate. There is an asymmetric carbon atom at the C-7 in hydroprene and, accordingly, there are (R) and (S) enantiomers of the compound. As used herein "(R,S)-hydroprene" refers to the racemic mixture and "(S)-hydroprene" refers to hydroprene comprising a predominance of the (S)-(+) enantiomer. Where "hydroprene" is used herein without reference to its enantiomeric content, the term is inclusive of both (R,S)-hydroprene and (S)-hydroprene.

Examples of active ingredients which may be suitable for use in the practice of the invention include 2-chloro-N-[[[3,5-dichloro-4-[3,4,5-trichloro-1-pyrazolyl]phenyl]amino]carbonyl]-benzamide, propetamphos, fluvalinate, fluphenacur, cyromazine, chlorfluazuron, fenoxycarb, di-flubenzuron, flucycloxuron, hexafluron, teflubenzuron, flufenxouron, triflumuron, pyrtproxyfen, chlorpyrifos ethyl, chlorpyrtfos methyl, cypermethrin, lambda-cyhalothrin, cyfluthrtn, fenvalerate, es fenvalerate, deltamethrin, fenpropathrin, bifenthrin, permethrin, ethofenprox, tralomethrin, alpha-cypermethrin and bendiocarb.

The active ingredient (a.i.) may be formulated as liquids in conventional manner prior to inclusion in the frangible container e.g. ampule. Where the a.i. is itself a liquid as is the case with hydroprene, it may be employed unformulated.

A discussion of the formulation and use of (R,S)-hydroprene and (S)hydroprene against cockroaches is contained in UK Patent Application GB 2174908 (U.S. Ser. No. 07/518,274) and South African Patent 88/2605 (U.S. Ser. No. 07/377,376) the contents of each of which in this respect is incorporated herein by reference.

As mentioned above the number of devices employed will depend on various factors. However, satisfactory results are obtained, in the case of hydroprene, when employing sufficient devices to achieve an a.i. concentration of 12 to 50 mg/m$^2$ for (R,S)-hydroprene and 0.3 to 40 mg/m$^2$, especially 3 to 30 mg/m$^2$ for (S)-hydroprene.

Alternatively a device according to the invention may be used on domestic animals to combat e.g. ticks, fleas and other parasites. For example, a conveniently sized device may be attached to an animal's collar from whence the active ingredient will translocate over the animal's skin or fur once the container is ruptured. The concentration or amount of active ingredient in the device will vary according to size of the animal, hair length, nature of the active ingredient and various other factors and can be determined by one skilled in the art by routine experimentation.

A specific embodiment according to the invention will be described below.

Figure 1:
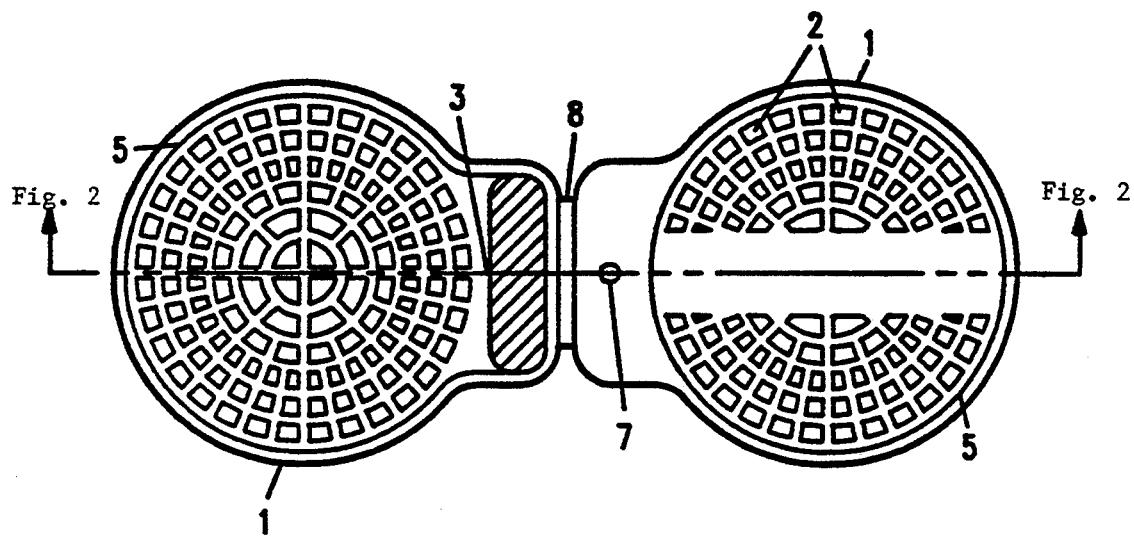
FIG. 1 is a plan view of a device according to the invention prior to closure.
Figure 2:
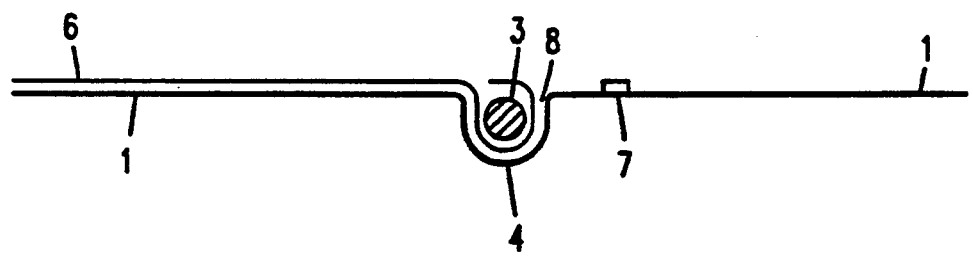
FIG. 2 is a side elevation of the device in FIG. 1.
Figure 3:
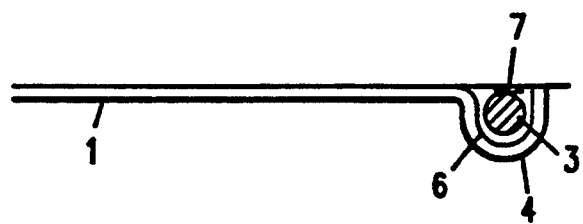
FIG. 3 is the device as shown in FIG. 2 but in closed position.

The device comprises two circular flexible plastic disks 1 of equal size hinged together in the manner of a hi-valve via hinge portion 8 of slightly thinner and thus more flexible plastic. The disks and hinge portion are formed as one piece e.g. by injection molding. One of the disks bears a pod-shaped recess 4 which contains a frangible ampule 3 containing the a.i. The other disk bears a pressure point 7 of thicker plastic which is located above the ampule when the device is closed as in FIG. 3. The ampule rests on a filter paper sheet 6 which surrounds it in the pod and extends over the area of one disk up to the rim 5. For clarity filter paper 6 is not shown in FIG. 1. Each disk bears a multitude of apertures 2. Once the ampule and filter paper have been placed in position the disks 1 are folded in upon each other and sealed around the rim 5, e.g. by heat or sonic welding.

To use, pressure is applied to the bottom of the pod 4 and the pressure point 7, e.g. using finger and thumb thus causing the ampule 3 to rupture and release its contents onto the filter paper 6. The active ingredient then translocates from the device via apertures 2.

The content of application Ser. No. 07/580,018 and drawings filed therewith are incorporated herein by reference.

We claim:

1. A point source insect control device which comprises a frangible container poorly permeable to gases and liquids containing a liquid insecticidal substance capable of translocation; a sheet of absorbent material at least one portion of which at least partially surrounds or is in close proximity with said container; and an enclosure for said container and said absorbent sheet; said enclosure bearing multiple perforations or apertures sufficient to allow translocation of said insecticidal substances once said frangible container is ruptured.

2. A device according to claim 1 wherein the absorbent sheet is made of filter paper.

3. A device according to claim 1 wherein the enclosure is made of flexible plastics material.

4. A device according to claim 1 which comprises two flexible plastic disks attached to each other around their outer rims, one of said disks bearing a recess containing a frangible ampule containing a liquid insecticidal substance said disks having retained between them a sheet of filter paper which also surrounds said ampule.

5. A device according to claim 1 wherein the insecticidal substance is or contains hydroprene.

6. A device according to claim 1 wherein the container is made of rigid plastic material or glass.

7. A device according to claim 6 wherein the plastic material is a thermosetting resin.

8. A device according to claim 6 wherein the container is an ampule.

9. A device according to claim 8 wherein the ampule is made of glass.

10. A method of controlling insects at an enclosed locus which comprises placing in said enclosed locus one or more point source insect control devices each comprising a frangible container poorly permeable to gases and liquids containing a liquid insecticidal substance capable of translocation; a sheet of absorbent material at least one portion of which at least partially surrounds or is in close proximity with said container; and an enclosure for said container and said absorbent sheet; said enclosure bearing multiple perforations or apertures sufficient to allow translocation of said insecticidal substances once said frangible container is ruptured; and rupturing said frangible container in each device whereby the number of devices placed in said locus is sufficient to provide an effective amount of insecticidally active substance.

11. A method according to claim 10 wherein the insecticidally active substance is hydroprene.

* * * * *